United States Patent [19]
Sandrock

[11] Patent Number: 6,098,478
[45] Date of Patent: Aug. 8, 2000

[54] LINEAR PICK AND PLACE DRIVE WITH ADJUSTABLE STROKE RANGES

[75] Inventor: Don G. Sandrock, McHenry, Ill.

[73] Assignee: Emerson Electric Co., St. Louis, Mo.

[21] Appl. No.: 09/186,928

[22] Filed: Nov. 6, 1998

[51] Int. Cl.[7] .................................................. F16H 25/08
[52] U.S. Cl. ........................................ 74/53; 74/54
[58] Field of Search ................... 74/53, 104, 54, 74/45, 102, 99 R

[56] References Cited

U.S. PATENT DOCUMENTS

| | | | |
|---|---|---|---|
| 1,865,309 | 6/1932 | Evans et al. | 74/53 |
| 3,178,040 | 4/1965 | Nelson . | |
| 3,703,834 | 11/1972 | Beezer . | |
| 3,751,996 | 8/1973 | Beezer . | |
| 3,768,320 | 10/1973 | Pons | 74/53 |
| 3,779,089 | 12/1973 | Beezer . | |
| 3,865,253 | 2/1975 | Healy . | |
| 3,881,362 | 5/1975 | Beezer . | |
| 3,974,705 | 8/1976 | Wittkamp | 74/53 |
| 4,155,272 | 5/1979 | Mosher . | |
| 4,289,040 | 9/1981 | Haluko, Jr. . | |
| 4,453,882 | 6/1984 | Mang . | |
| 4,599,909 | 7/1986 | Koller . | |
| 5,337,623 | 8/1994 | Huang et al. | 74/813 R |
| 5,813,281 | 9/1998 | Yoshida et al. | 74/36 |

FOREIGN PATENT DOCUMENTS 2153281  8/1986  United Kingdom .

OTHER PUBLICATIONS

1987 Commercial Cam Division Emerson Electric Co. "CAMBOT® Linear Pick–N–Place Cam–Operated Parts Handlers" product catalog.
Mar. 27, 1990 Schematic diagrams of 100LPP CAMBOT by CAMCO.

*Primary Examiner*—David M. Fenstermacher
*Attorney, Agent, or Firm*—Tilton, Fallon, Lungmus & Chestnut

[57] ABSTRACT

A linear pick-and-place drive mechanism for relocating articles with finite adjustable maximum translation stroke range and finite adjustable lift stroke range, using selective placement of a translation cam follower into one of several spaced adjustment holes along the length of a translation arm, and selective placement of a lift cam follower into one of several spaced adjustment holes along the length of a lift arm. Pivoting motion of both the translation arm and the lift arm is driven by a single plate-type drive cam having a translation cam track on one side thereof and a lift cam track on the opposite side thereof, resulting in minimal housing size and reduced power requirements.

15 Claims, 4 Drawing Sheets

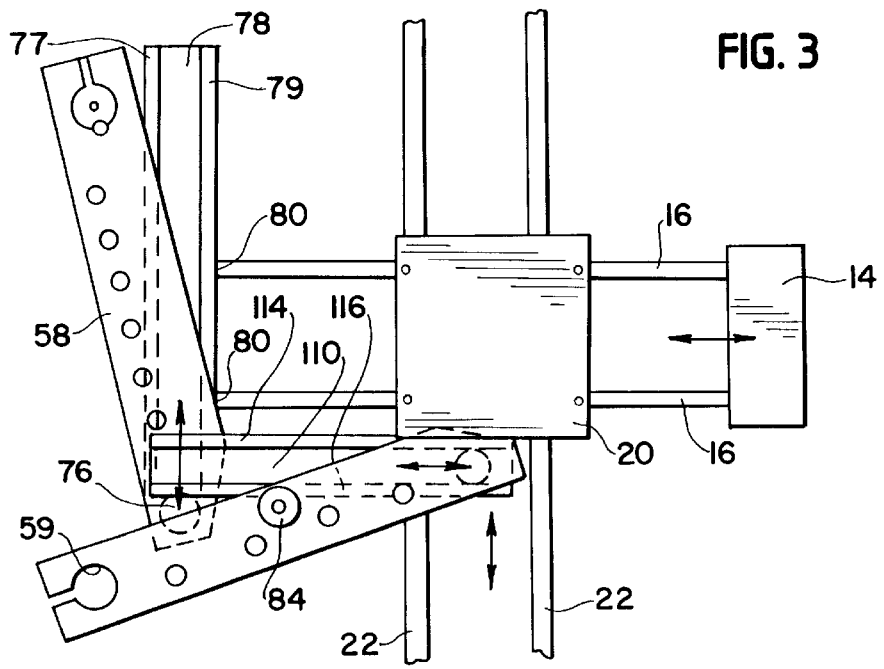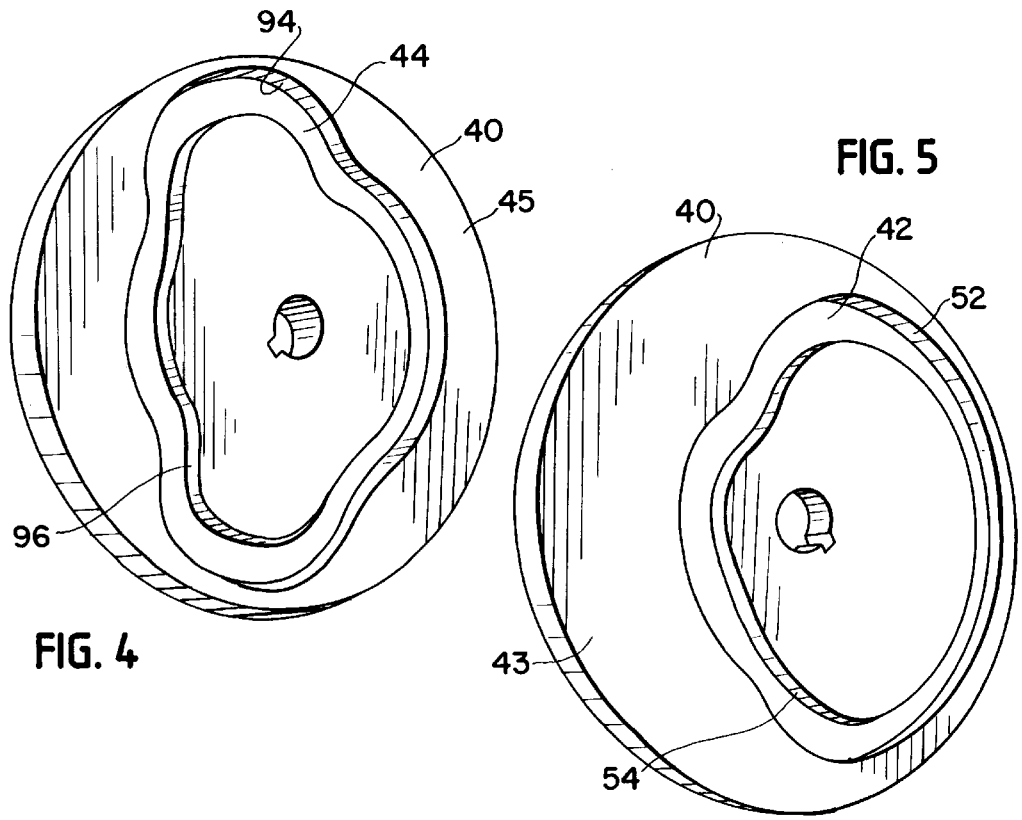

LINEAR PICK AND PLACE DRIVE WITH ADJUSTABLE STROKE RANGES

BACKGROUND

1. Field of the Invention

This invention relates generally to transfer drive mechanisms and, more specifically, to cam-actuated pick-and-place drive mechanisms for imparting linear motion along two mutually perpendicular axes.

2. Description of the Prior Art

Linear pick-and-place devices have long been used to achieve automated transfer of articles, such as assembly components or tools in fully or partly automated manufacturing processes. They provide precision to a tedious task of repetitively moving a series of objects from one location to another nearby location. While various attempts have been made to improve the output, weight capacity, and performance of these linear pick-and-place devices, little has been done to optimize their manufacturing costs, serviceability and reliability. One drawback of existing linear pick-and-place devices is that the overall dimensions of the devices, including the housing (or so-called "envelope") tend to be relatively large, making a big "footprint," i.e. a relatively large amount of floor space at an assembly plant is occupied by the device. In part, the large dimensions of linear pick-and-place devices can be attributed to the fact that the devices include two cams, one for directing motion in a first, or x-direction, and another for directing motion in a second, or y-direction.

A useful improvement in the history of the development of linear pick-and-place devices has been the advent of adjustable stroke lengths for such devices. By being able to set the stroke lengths either at the site of manufacture prior to shipment, or better yet, by the end user, such linear pick-and-place devices have been able to meet demand to perform tasks in a variety of specific assembly settings without the need for individual customized manufacture. Generally, adjustability has been achieved using an infinitely adjustable slide block mounted on the edge of a first carriage. The infinitely adjustable slide block may incorporate a movable pivot slide, such as a threadedly-mounted pivot slide that is used in conjunction with a threaded rod, as typified in U.S. Pat. Nos. 3,751,996 and 3,881,362, to control the range of translational movement, or lift movement, or both.

A drawback of these infinitely adjustable slide blocks is that the increased mass of the threaded rod and pivot slide result in increased inertia in the corresponding arm that controls either translational or lift movement. This relatively high inertia in the arm member, in turn, tends to require a higher capacity motor and reducer to operate the drive shaft that controls movement of the corresponding cam. Another drawback is that the slide block needs to be locked in place along the threaded rod. Fastening means, such as an allen bolt or cotter pin, is required. Should the fastening means become loose, the slide block may slip, particularly if the threads of the threaded rod become stripped over time, in which case positioning accuracy is lost. This would likely have a detrimental effect on quality control of the overall assembly process in which the linear pick-and-place drive is used.

The manner in which these and other drawbacks of prior adjustable linear pick-and-place devices are overcome by the present invention is set forth in the following Summary of the Invention, the Drawings, and the Detailed Description of the Preferred Embodiment.

SUMMARY OF THE INVENTION

The present invention incorporates several novel modifications to the design for a linear pick-and-place device, which result in a device having a smaller overall size or envelope, requires less power from a motor and reducer to operate, and provides highly reliable, easily changeable finite adjustability to both the translation and lift strokes. The linear pick-and-place drive of the present invention utilizes a single, dual-sided, motor-driven cam to control both translational motion and lift motion, contrary to the conventional linear pick-and-place devices that utilized separate cams for controlling movement in each linear direction.

For the sake of convenience, the terms horizontal and x-direction are used herein to refer to the translational axis of movement, and the terms vertical and y-direction are used herein to refer to the lift axis of movement. In the preferred embodiment of the present invention, the linear pick-and-place device has a housing with a translation pivot block in one internal corner and a lift pivot block in an adjacent internal corner. The translation pivot block covers a first, non-adjustable translation pivot arm that has a first translator cam follower seated therein. This first translation cam follower extends forwardly of the first, non-adjustable translation pivot arm at the distal end thereof, and is engaged by the walls of a lubricated translation cam track in the rear side of the cam.

An elongated duplication shaft or pivot pin extends from the proximate end of the first, non-adjustable translation pivot arm, through a channel in the translation pivot block, and extends forwardly of the translation pivot block. A second translation arm, which features a series of spaced or staggered adjustment holes, is attached to the duplication shaft or pivot pin at the front end of the translation pivot block. The adjustment holes allow for the placement of a second translation cam follower at a variety of finite locations along the second translation arm, with each hole corresponding to a different maximum translation stroke range. In a most-preferred embodiment, the successive holes are spaced so as to result in a 10 mm increase in maximum translation stroke with each placement of the second translation cam follower at an increasing distance from the duplication shaft. However, the holes can alternatively be formed at other locations to result in change in maximum translation stroke ranges of greater or less than 10 mm increments, so as to accommodate a given end user's specific individual assembly or transfer application requirements if they are not met by the stroke ranges available in the preferred, unmodified device.

It will be understood that the duplication shaft causes the second translation arm to duplicate the motion of the first translation pivot arm, such that movement imparted to the first translation cam follower by the translation cam track on the rear side of the cam is echoed simultaneously at the second translation cam follower. In order to impart horizontal or x-direction movement to an output member, also referred to herein as a mounting block, and sometimes referred to in the art as an end block, the second translation cam follower rides in an elongated translation track having an inverted-U-shape, which is bolted to the ends of translational slide rails attached to the mounting block. The translational slide rails extend through a carriage block that rides along lift slide rails extending between the top and bottom of the housing.

One means of fixing the lift slide rails to the housing is to provide a precision machined end to each of the lift slide rails, which is received in a corresponding precision bored hole in the top or bottom wall of the housing. The opposite ends of the lift slide rails rest in precision bored holes at the opposite wall of the housing, and can be fixed in place using set screw against the lift slide rails or a press fit between the rails and the wall of the housing.

On the front side of the cam is a lubricated lift cam track, having a different profile than the translation cam track. A lift arm having a generally centrally-located, rearwardly-extending first lift cam follower seated therein is located forwardly of the cam, and pivotally mounted by means of a lift pivot pin to the lift pivot block located in an internal corner of the housing of the pick-and-place device adjacent the translation pivot block.

The first lift cam follower is engaged by the walls of the lift cam track. In a similar manner to the second translation arm, the lift arm includes several spaced or staggered adjustment holes therein to locate a second, forwardly-extending lift cam follower. The adjustment holes provide a means for selectively adjusting the maximum lift stroke range, with the farthest hole from the pivot pin corresponding to the longest possible lift stroke range.

Preferably, the holes along the lift arm are also spaced to provide a 10 mm increment in the maximum lift stroke range to correspond to successive hole locations of the second lift cam follower. The second lift cam follower rides in a lift track having an inverted-U-shape that is secured to a bottom end of the carriage. In this manner, vertical or y-direction movement is imparted to the carriage along the lift slide rails, and simultaneously, to the mounting block, which is constrained in the y-direction to move together with the carriage.

By providing the means for adjustment of both maximum lift stroke range and maximum translation stroke range, and using only a single cam, the present invention advantageously eliminates the need for much of the excess mass found in conventional adjustable linear pick-and-place devices. For example, mass added by threaded rods and slide blocks in infinitely-adjustable pick-and-place devices is completely eliminated in the present invention. Instead, finite adjustment is provided by means of a series of holes in both the second translation arm and the lift arm, which holes advantageously further reduce the overall mass and inertia of these respective arms. Further, only one two-sided cam is used, instead of two separate drive cams. As a result, substantially lower power is required from the associated drive motor.

The present invention is also easily adjustable either at the point of manufacture just prior to shipment, or by the end user. Since the present invention has fewer parts than conventional linear pick-and-place devices, it is more compact and leaves a smaller footprint, thus conserving valuable manufacturing plant floor space, and permitting more tooling space, for end users. Although infinite adjustability is capable of accommodating more variation in the maximum lift range and maximum translation range settings, it has been found that the finite adjustability of the type achieved by the present invention would be adequate to meet the needs of most users of adjustable linear pick-and-place devices. Thus, the benefits achieved by lower power requirements, ease of adjustment, and smaller footprint dimensions of the overall device combine to far outweigh any limitations to the finite adjustability of the present invention, as compared to prior infinitely adjustable linear pick-and-place devices.

DESCRIPTION OF THE DRAWINGS

FIG. 3 is a rear elevational view of the linear pick-and-place device shown in FIG. 1, viewed from just forward of the cam;

FIG. 4 is a front perspective view of the cam of the linear pick-and-place device, showing a preferred profile of the lift cam track;

FIG. 5 is a rear perspective view of the cam shown in FIG. 4, showing a preferred profile of the translation cam track;

DETAIL DESCRIPTION OF THE PREFERRED EMBODIMENT

Figure 1:
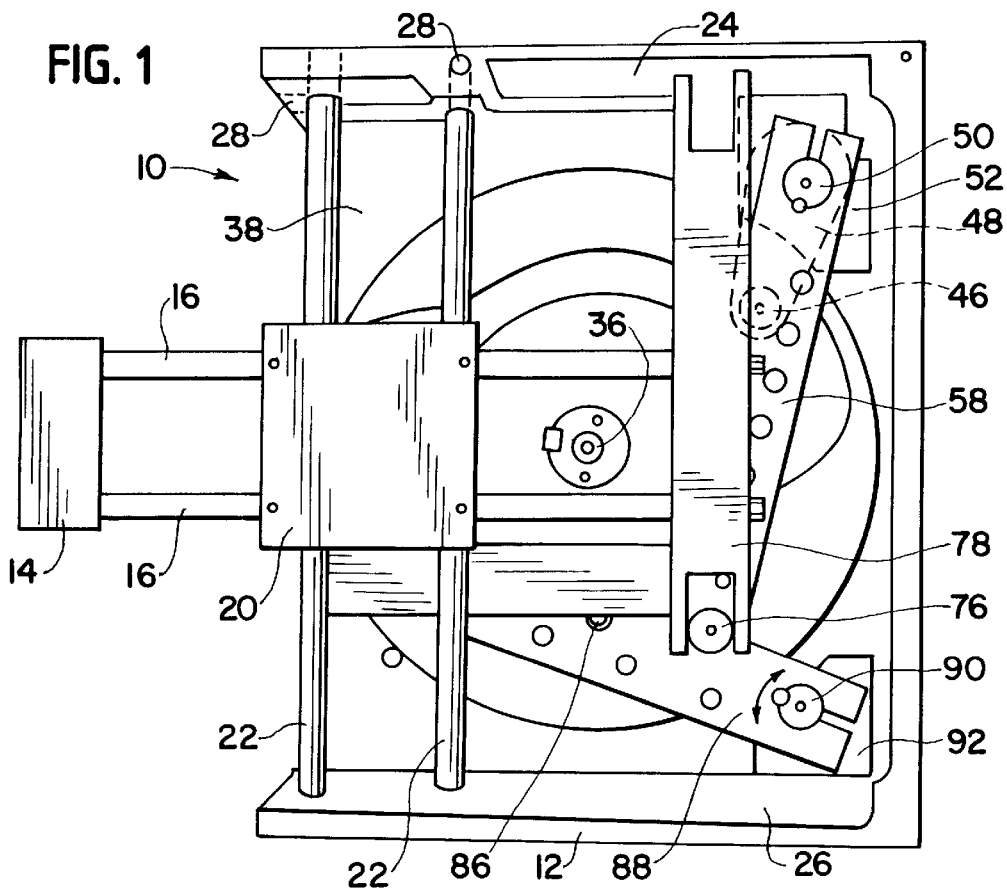
FIG. 1 is a front elevation view of the linear pick-and-place device of the present invention, with the front cover of the housing removed for better viewing.

The linear pick-and-place drive 10 of the present invention achieves many advantages over conventional linear pick-and-place drive devices, including infinitely adjustable pick-and-place drives. As is discussed in greater detail below, the present invention provides finite adjustability to the maximum translation and stroke ranges, while minimizing parts, power requirements, and overall size. By reference to the drawing figures, the pick-and-place device 10 sits in a housing 12. For the sake of convenience, the front and left side walls of the housing 12 are removed in the drawing figures. In the event a left side wall (not shown) were used, it would include an elongated aperture therein to allow for a mounting block 14 to travel a maximum stroke length up and down, i.e. in the y-direction, during lift strokes of the device 10.

The mounting block 14, sometimes referred to in the art as an end block, is the active or output piece of the linear pick-and-place device, in that it extends outside the housing 12 to engage (via an associated gripper hand—not shown) and move work pieces and other articles, such as parts to be relocated in a conveyor line or walking beam manufacturing or assembly process. The mounting block 14 is secured to the first ends 15 of a pair of translation slide rails 16. These translation slide rails 16 pass through a corresponding pair of cylindrical apertures 18 in a carriage block 20, making the translation slide rails in sliding engagement with the cylindrical apertures 18. The translation slide rails 16 are constrained by means of the cylindrical apertures 18 in the carriage block 20 to move independently of the carriage block 20 only in the horizontal or x-direction, but also to travel with the carriage block 20 in the vertical or y-direction. In other words, during a lift stroke, all of the carriage block 10, the translation slide rails 16, and the mounting block 14 travel in the y-direction, while during a translation stroke, only the mounting block 14 and the translation slide rails 16 travel in the x-direction.

Figure 6:
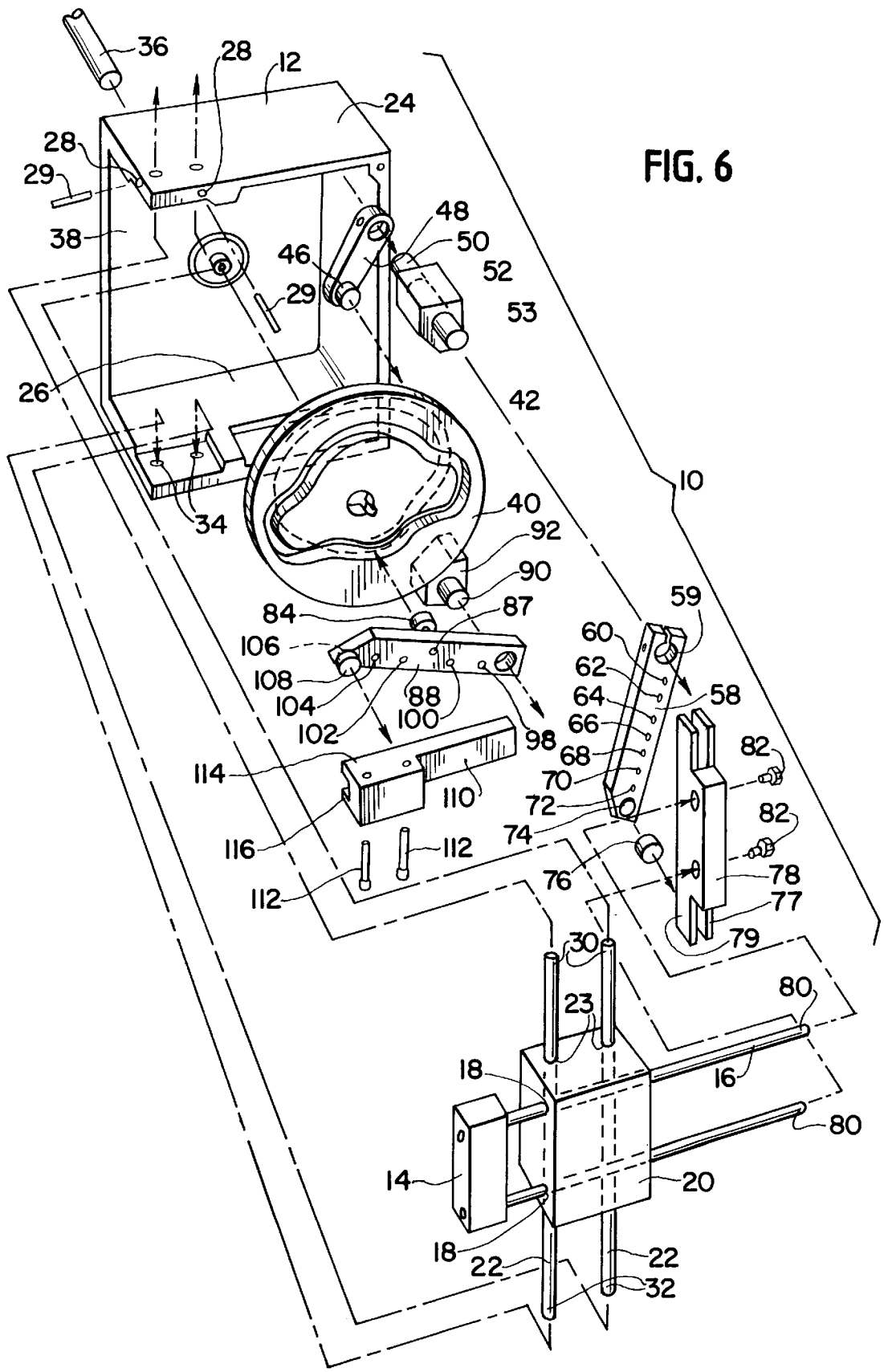
FIG. 6 is an exploded view of the linear pick-and-place device shown in FIG. 1.

The carriage block 20 rides along a pair of lift slide rails 22 extending through a second pair of apertures 23 in the carriage block 20, in a direction perpendicular to the translation slide rails and associated apertures 18. The lift slide rails 22 extend between the top wall 24 and bottom wall 26 of the housing 12. One suitable means for securing the lift slide rails 22 in between the top wall 24 and bottom wall 26 is to provide a precision bored opening 28 to receive a set screw 29 for each of the lift slide rails 22, with the precision bored openings 28 in both the front end of top wall 24, as shown in FIGS. 1 and 6, and in the left side of the top wall 24. The opposite ends 32 of the lift slide rails are received in precision bored holes 34 in the bottom wall 26 as shown in FIGS. 1 and 6. A set screw 29 is used to secure the lift slide rails 22 in place, or alternatively, a press fit may be used. The lift slide rails 22 constrain the carriage block 20 to move only in the y-direction.

Actuation of the carriage block 20 and the mounting block 14 is accomplished by a translation means and a lift means. Such translation and lift means are powered by a single motor and reducer combination (not shown) that drivably rotates an input shaft 36 extending through a rear wall 38 of the housing 12. The input shaft 36 rotates a single cam 40 of the flat wheel or plate cam type. The cam 40 has an input shaft opening 41 to receive the input shaft 36, and a suitable locking means is provided to secure the cam 40 on the input shaft 36 in a well-known fashion. Advantageously, the single cam 40 has a translation cam track 42 cut into its rear side 43, and a lift cam track 44 cut into its front side 45. This dual-track design for the cam 40 permits use of a single plate cam to control both translation and lift strokes, which occupies only minimal space within the housing 12.

Translation Stroke

Figure 2:
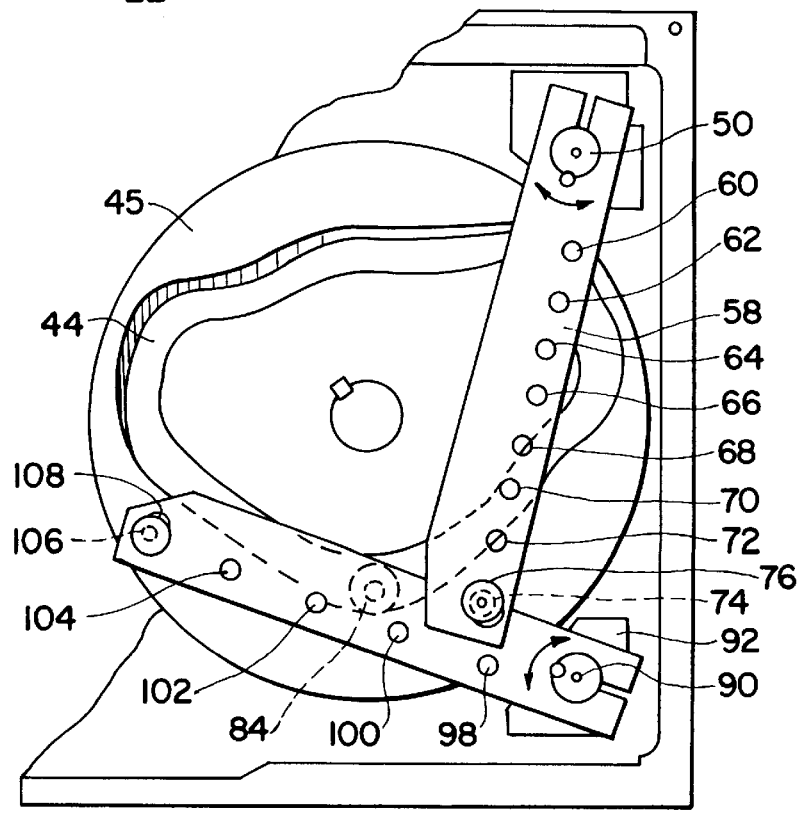
FIG. 2 is a front elevation view of the linear pick-and-place device shown in FIG. 1, having the carriage block, lift slide rails, translation slide rails, lift slide track and translation slide track components removed for clarity.

The means for imparting translational motion to the mounting block 14 includes a first translation cam follower 46 that extends forwardly of a first, non-adjustable translation pivot arm 48 located at the rear wall 38 of the housing 12. The first translation pivot arm 48 is fixed to a translation pivot pin 50 that extends perpendicularly to the first translation pivot arm 48 from the rear wall 38 toward the front of the linear pick-and-place device 10. The translation pivot pin 50 is rotatably seated in a translation pivot block 52, as seen in the upper right corner of FIG. 2, and has a front end 53 that extends forwardly of the translation pivot block 52. The first translation cam follower 46 rides in the translation cam track 42, which is preferably well lubricated. The first translation cam follower 46 engages the walls 54, 56 of the translation cam track 42, which causes the first translation pivot arm 48 to pivot in one direction or the other about the translation pivot block 52, except during any dwell in the translation cam track 42.

A second, adjustable translation pivot arm 58 is fixed to the front end 53 of the translation pivot pin 50 by means of a pivot pin receiving hole 59 in a first end of the second translation pivot arm 58. Because the first translation pivot arm 48 is fixed to the translation pivot pin 50, any rotational movement of the first translation pivot arm 48 is duplicated simultaneously by the second translation arm 58. The adjustability of the second translation pivot arm 58 is provided by translation stroke range adjustment means taking the form of a plurality of spaced translation stroke adjustment holes 60, 62, 64, 66, 68, 70, 72, 74 which are drilled or bored in the second translation pivot arm 58. Depending on the desired maximum translation stroke range for a given assembly application, a second, forwardly-extending translation cam follower 76 is selectively mounted in one of the translation stroke adjustment holes, i.e. in the hole that most closely results in such a maximum translation stroke range.

It will be appreciated that the farther the translation adjustment hole from the translation pivot pin 50 into which the second translation cam follower 76 is located, the longer the resulting maximum translation stroke range provided to the mounting block 14. More specifically, motion of the second translation cam follower 76 is transferred to the mounting block 14 by a translation slide track 78 in which the second translation cam follower 76 rides. This translation slide track 78 is essentially U-shaped in cross-section and is fixed to the second ends 80 of the translation slide rails 16, for example by hex head capscrew 82. The translation slide track 78 has walls or depending legs 77, 79 that bound the motion of the second translation cam follower 76. Thus, as the second translation arm 58 pivots with the motion of the first translation pivot arm 48 (because of the translation pivot pin 50) in response to rotation of the cam 40, the second translation cam follower 76 rides along translation slide track 78, thereby actuating the translation slide rails 16 and thus the mounting block 14 in an output motion along the x-direction.

Lift Stroke

In a manner similar to the adjustable translation stroke described above, the means for imparting lift motion to the carriage block 20, and thus to the mounting block 14 (which is constrained by means of the translation slide rails 16 being located in the cylindrical apertures 18 to always travel with the carriage block 20 in the y-direction) includes a rearwardly extending first lift cam follower 84, attached by means of a cam follower stud 86 fitting through a first hole 87 in the lift pivot arm 88. The lift pivot arm 88 rotates about a lift pivot pin 90 that extends forwardly of a lift pivot block 92, shown at the bottom right of FIG. 1.

The first lift cam follower 84 rides in the lift cam track 44 on the front side 45 of the cam 40, and the lift cam track 44 is again preferably well lubricated. The first lift cam follower 84 is engaged by the walls 94, 96 of the lift cam track 45, which in turn causes the lift pivot arm 88 to pivot in one direction or the other about the lift pivot pin 90.

The adjustability of the lift pivot arm 88 is provided by lift stroke range adjustment means taking the form of a plurality of spaced lift stroke adjustment holes 98, 100, 102, 104, 106, which are similarly drilled or bored in the lift pivot arm 88. Depending on the desired maximum lift stroke range, a second, forwardly-extending lift cam follower 108 is selectively mounted in one of the lift stroke adjustment holes that most closely results in such a maximum lift stroke range.

It will again be appreciated that the farther the lift adjustment hole from the lift pivot pin 90 into which the second lift cam follower 108 is located, the longer the resulting maximum lift stroke range. The lift-imparting motion of the second lift cam follower 108 is transferred to the carriage block 20 (and thereby, ultimately to the mounting block 14 as well) by a lift slide track 110 in which the second lift cam follower 108 rides. This lift slide track 110 is essentially U-shaped in cross-section and is fixed to the bottom of the carriage block 20, for example by socket head capscrews 112. The lift slide track 110 has walls or depending legs 114, 116 that bound the motion of the second lift cam follower 108. Thus, as the lift pivot arm 88 pivots in response to rotation of the cam 40, the second lift cam follower 108 rides along the lift slide track 110, thereby actuating the carriage block 20 and the mounting block 14 with an output motion along the y-direction. Thus, it will be appreciated that mounting block 14 can be simultaneously provided, depending on the shape and sequence of the cam tracks 42, 44, with both lift and translation motions.

Adjustment Hole Selection

The selection of the proper translation stroke adjustment hole and lift stroke adjustment hole, i.e. to correspond to desired maximum translation stroke and lift stroke ranges, can be facilitated by tabular charts (not shown) provided along with the linear pick-and-place device 10. Alternatively, the selection can be facilitated by a computer program (not shown) that queries or prompts a user to input the desired maximum translation stroke and lift stroke ranges, and then outputs the proper corresponding adjustment hole settings for the second translation cam follower 76 and second lift cam follower 108.

In the preferred embodiment, translation stroke adjustment holes 60–74 are spaced from one another to result in incremental, 10 mm increases in maximum translation stroke range. Similarly, lift stroke adjustment holes 98–106 are spaced from one another to result in incremental, 10 mm increases in maximum lift stroke range. However, it will be recognized that the translation and lift stroke adjustment holes can be placed in closer proximity to one another, or more adjustment holes added to the second translation arm 58 or to the lift pivot arm 88, to result in more gradual finite changes in maximum translation or lift stroke ranges. Likewise, fewer adjustment holes could be provided, or the adjustment holes could be spaced farther apart, to instead achieve larger finite changes in maximum translation or lift stroke ranges, such as by 15 mm or 20 mm incremental changes. In the event further customization is required for a given application, i.e. one requiring very specific translation and/or stroke ranges that do not result from any of the adjustment hole locations in the preferred embodiment, a further hole can be drilled or bored by the manufacturer, i.e. in either the second translation arm 58 or a lift pivot arm 88, or both, to achieve the desired custom translation and/or lift stroke ranges for a specific assembly or transfer application.

Output Motion of Pick-and-Place Device

One preferred cycle of output movement (refer to FIG. 7) of the carriage block 20 and mounting block 14, corresponding to a single rotation of the cam 40, is as follows:

Home location, or location at Time 0, has the carriage block 20 located at the highest position allowed by the selected placement of the second lift cam follower 108 along the lift pivot arm 88, with the mounting block 14 fully retracted.

Location at Time 1 has the carriage block 20 located at the lowest position, i.e. at the bottom of the lift slide rails 22, with the mounting block 14 still fully retracted.

Location at Time 2 has the carriage block 20 returned to the highest position allowed by the selected placement of the second lift cam follower 108 along the lift pivot arm 88, with the mounting block 14 still fully retracted.

Location at Time 3 has the carriage block 20 still located at the highest position allowed by the selected placement of the second lift cam follower 108 along the lift pivot arm 88, but now with the mounting block 14 extended to the farthest position in the x-direction allowed by the selected placement of the second translation cam follower 76 along the second translation arm 58.

Location at Time 4 has the carriage block 20 returned to its lowest position, with the mounting block 14 still extended to the farthest position in the x-direction as allowed by the selected placement of the second translation cam follower 76 along the second translation arm 58.

Location at Time 5 has the carriage block 20 located back at the highest position allowed by the selected placement of the second lift cam follower 108 along the lift pivot arm 88, with the mounting block 14 still extended to the farthest position in the x-direction as allowed by the selected placement of the second translation cam follower 76 along the second translation arm 58.

Location at Time 6 has the carriage block 20 and mounting block 14 located back at the Home location.

Figure 7:
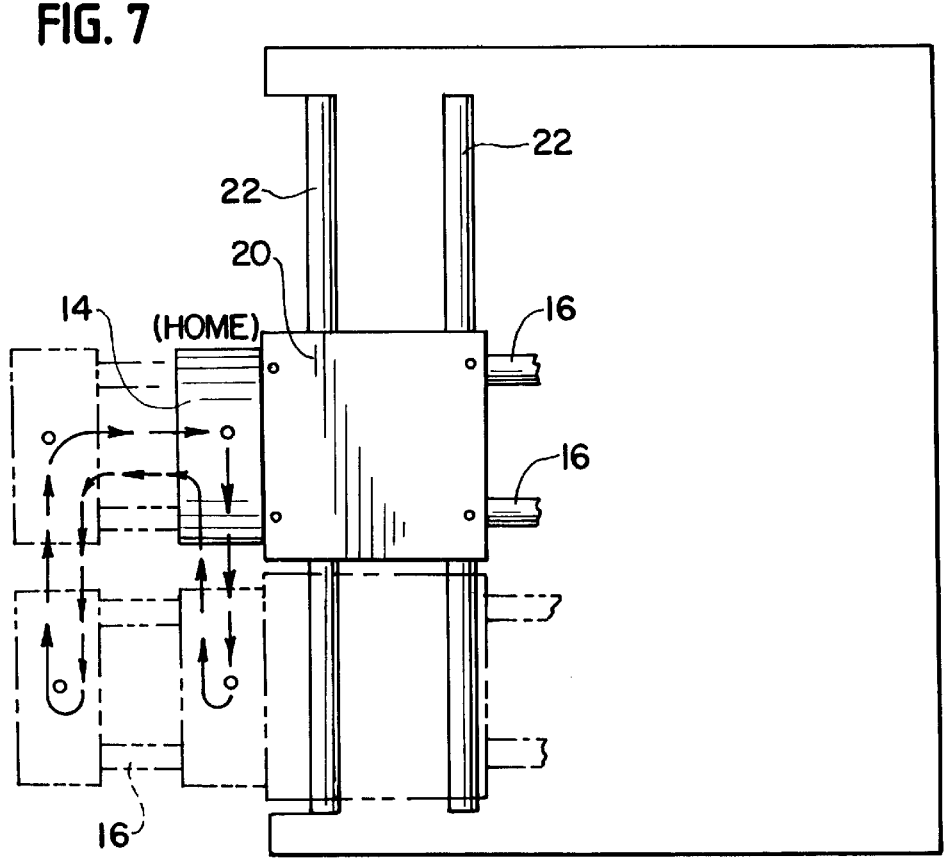
FIG. 7 is a front elevation view of the linear pick-and-place device of the resent invention, with the front wall partially cut away, showing the mounting block and carriage block in each of their extreme lift and translation stroke positions.
Figure 8:
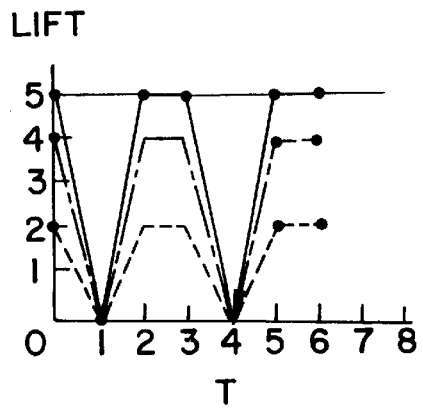
FIG. 8 is a graphical representation of various preferred complete cycles of lift motion of the finite adjustable linear pick-and-place device corresponding to one complete revolution of the cam.
Figure 9:
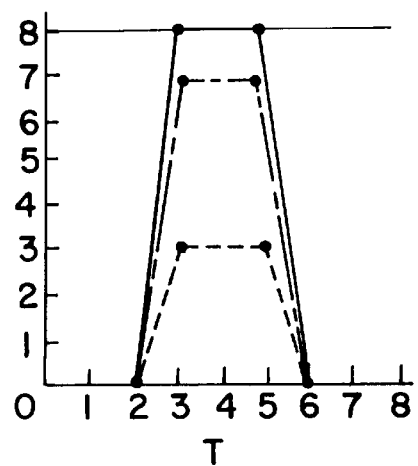
FIG. 9 is a graphical representation of various preferred complete cycles of translation motion of the finite adjustable linear pick-and-place device corresponding to one complete revolution of the cam.

This particular motion cycle is shown in FIG. 7, with FIGS. 8 and 9 graphically displaying the corresponding lift stroke, or y-direction displacement, and the translation stroke, or x-direction displacement, respectively. It will be appreciated by those of ordinary skill in the art that this motion cycle can be reversed by simply reversing rotation of the input shaft 36, or can be otherwise altered by using a drive cam 40 having different motion patterns for the translation cam track 42 and/or the lift cam track 44.

While the present invention of a finite, adjustable linear pick-and-place device 10 has been described with respect to certain preferred embodiments thereof, it is not intended to be limited thereto. It is recognized that changes can be made that are still within the scope of the appended claims.

I claim:

1. A linear pick-and-place drive mechanism having adjustable translation stroke and lift stroke ranges, comprising:
   finite, non-threaded translation stroke adjustment means for setting said linear pick-and-place drive mechanism to output one of a preselected discrete set of maximum translation stroke ranges; and
   finite, non-threaded lift stroke adjustment means for setting said linear pick-and-place drive mechanism to output one of a preselected discrete set of maximum lift stroke ranges.

2. The linear pick-and-place drive mechanism of claim 1, wherein said finite, non-threaded translation stroke adjustment means comprises a translation arm having a plurality of translation adjustment holes therein for selected placement of means for slidably connecting an output member to said translation arm, and said translation arm further including a means for communicating with a drive cam to actuate said translation arm, thereby actuating translation motion of said output member.

3. The linear pick-and-place drive mechanism of claim 1, wherein said finite, non-threaded lift stroke adjustment means comprises a lift pivot arm having a plurality of lift adjustment holes therein for selected placement of means for slidably connecting said lift pivot arm to a carriage block that forces lift movement of an output member, and said lift pivot arm further including a means for communicating with a drive cam to actuate said lift pivot arm, thereby actuating lift motion of said output member.

4. A linear pick-and-place drive mechanism having adjustable translation stroke and lift stroke ranges, comprising:
   finite translation stroke adjustment means for setting said linear pick-and-place drive mechanism to output one of a preselected set of maximum translation stroke ranges;
   finite lift stroke adjustment means for setting said linear pick-and-place drive mechanism to output one of a preselected set of maximum lift stroke ranges; and
   a single drive cam to control both translation and lift output movements of an output member.

5. The linear pick-and-place drive mechanism of claim 4, wherein said finite lift stroke adjustment means comprises a lift pivot arm having a plurality of lift adjustment holes therein for selected placement of means for slidably connecting said lift pivot arm to a carriage block that forces lift movement of said output member, and said lift pivot arm further including a means for communicating with said single drive cam to actuate said lift pivot arm, thereby actuating lift motion of said output member.

6. The linear pick-and-place drive mechanism of claim 5, wherein said lift adjustment holes are separated from one another a distance corresponding to a preselected incremental change in maximum lift stroke range.

7. The linear pick-and-place drive mechanism of claim 4, wherein said finite translation stroke adjustment means comprises a translation arm having a plurality of translation adjustment holes therein for selected placement of means for slidably connecting said output member to said translation arm, and said translation arm further including a means for communicating with said single drive cam to actuate said translation arm, thereby actuating translation motion of said output member.

8. The linear pick-and-place drive mechanism of claim 7, wherein said translation adjustment holes are separated from one another a distance corresponding to a preselected incremental change in maximum translation stroke range.

9. A linear pick-and-place drive mechanism having finite adjustable translation stroke and lift stroke ranges, comprising:

a single drive cam having a translation cam track in a first side of said single drive cam and a lift cam track in a second side thereof;

an input shaft in communication with an external drive means and said single drive cam for imparting rotation to said drive cam;

an output member in slidable communication in an x-direction with a carriage block along at least one translation slide rail extending through said carriage block, and said carriage block in slidable communication in a y-direction with at least one lift slide rail extending through said carriage block;

a means for imparting motion in said x-direction to said output member including means for selectively adjusting a maximum range of motion in the x-direction of said output member among a plurality of preselected maximum ranges of motion and means for communicating between a first translation cam follower riding in said translation cam track and said at least one translation slide rail; and a means for imparting motion in said y-direction to said carriage block and said output member, including means for selectively adjusting a maximum range of motion in the y-direction of said carriage block and said output member among a plurality of preselected maximum ranges of motion and means for communicating between a first lift cam follower riding in said lift cam track and said carriage block.

10. The linear pick-and-place drive mechanism of claim 9, wherein said means for selectively adjusting a maximum range of motion in the y-direction comprises an adjustable lift arm having a pivot pin located in a pivot-pin-receiving aperture at a first end thereof, and a plurality of spaced lift adjustment holes along the length of said adjustable lift arm for selectively receiving a second lift cam follower that rides in a lift slide track secured to said carriage block.

11. The linear pick-and-place drive mechanism of claim 10, wherein said means for communicating between said first lift cam follower riding in the lift cam track and said carriage block comprises:

a first lift cam follower aperture in said adjustable lift arm that receives a cam follower stud of said first lift cam follower;

a lift pivot pin pivotally mounting said adjustable lift arm to a lift pivot block, said lift pivot pin being received in a hole at a first end of the adjustment lift arm, remote from said first lift cam follower aperture; and the second lift cam follower located in one of said lift adjustment holes, that rides in the lift slide track secured to the carriage block.

12. The linear pick-and-place drive mechanism of claim 10, and further including means for increasing the adjustability of said maximum lift stroke range, said means comprising providing additional lift adjustment holes along the length of said adjustable lift arm.

13. The linear pick-and-place drive mechanism of claim 9, wherein said means for selectively adjusting a maximum range of motion in the x-direction comprises an adjustable translation arm having a translation pivot pin located in a pivot-pin-receiving aperture at a first end thereof, and a plurality of spaced translation adjustment holes along the length of said adjustable translation arm for selectively receiving a second translation cam follower that rides in a translation slide track attached to said at least one translation slide rail.

14. The linear pick-and-place drive mechanism of claim 13, wherein said means for communicating between the first translation cam follower riding in said translation cam track and said at least one translation slide rail comprises:

a first translation pivot arm rotatably mounted to a translation pivot block at a first end of the first translation pivot arm, and said first translation cam follower being secured to a second end of the first translation pivot arm;

the translation pivot pin extending between the first end of the first translation pivot arm and the pivot-pin-receiving aperture of the adjustable translation arm, whereby motion of said first translation pivot arm is duplicated by the adjustable translation arm; and the second translation cam follower, located in one of said translation adjustment holes, that rides in the translation slide track attached to the at least one translation slide rail.

15. The linear pick-and-place drive mechanism of claim 13, and further including means for increasing the adjustability of said maximum translation stroke range, said means comprising providing additional translation adjustment holes along the length of the adjustable translation arm.

* * * * *